United States Patent
Fujitani et al.

[11] Patent Number: 6,019,928
[45] Date of Patent: Feb. 1, 2000

[54] METHOD FOR RESIN INSERT MOLDING A CONNECTOR BLOCK FOR INJECTORS OF AN INTERNAL COMBUSTION ENGINE

[75] Inventors: Mitsuhiro Fujitani; Hisashi Konoya, both of Yokkaichi, Japan

[73] Assignee: Sumitomo Wiring Systems, Ltd., Yokkaichi, Japan

[21] Appl. No.: 08/941,191

[22] Filed: Sep. 30, 1997

Related U.S. Application Data

[62] Division of application No. 08/338,854, Nov. 14, 1994, Pat. No. 5,709,559.

[30] Foreign Application Priority Data

Nov. 17, 1993 [JP] Japan ..................... 5-312550

[51] Int. Cl.⁷ .................. B29C 45/14; B29C 70/70
[52] U.S. Cl. .................. 264/263; 264/274; 264/277
[58] Field of Search ........................ 264/273, 274, 264/275, 276, 277, 272.11, 263, 255, 250, 271.1, 259, 272.15

[56] References Cited

U.S. PATENT DOCUMENTS

| | | |
|---|---|---|
| 3,983,205 | 9/1976 | Barrett . |
| 4,758,172 | 7/1988 | Richards et al. ............... 439/212 |
| 4,857,003 | 8/1989 | Hafner et al. ................. 439/130 |
| 4,988,104 | 1/1991 | Shiotani et al. . |
| 5,100,311 | 3/1992 | Clemens et al. . |
| 5,238,415 | 8/1993 | Bittner et al. ................. 439/130 |
| 5,295,468 | 3/1994 | Blessing et al. . |
| 5,295,847 | 3/1994 | Ozaki et al. .................. 439/212 |
| 5,347,969 | 9/1994 | Gmelin et al. ................ 439/130 |
| 5,471,961 | 12/1995 | McArthur et al. ............. 439/130 |
| 5,527,502 | 6/1996 | Kiuchi et al. ................. 264/277 |

FOREIGN PATENT DOCUMENTS

| | | |
|---|---|---|
| 500 219 | 8/1992 | European Pat. Off. . |
| 3-77062 | 4/1991 | Japan . |
| 4-263913 | 9/1992 | Japan . |
| 1 433 135 | 4/1976 | United Kingdom . |

*Primary Examiner*—Angela Ortiz
*Attorney, Agent, or Firm*—Oliff & Berridge, PLC

[57] ABSTRACT

A connector block for injectors of an internal combustion engine having a bar-like body in which bar-like bus bars are arranged in a parallel attitude and embedded in resin. A core member includes bus bar slots in which the bus bars are placed in a desired attitude. Projections are positioned such that they butt against the inner wall of a mold cavity of a mold for resin molding. Holding-pin holes into which holding pins of the mold cavity are fitted so as to form a separation layer between the bus bars and the holding pins. The assembled core member is inserted into the mold cavity of the mold for resin molding, to be held thereby, and the core member is embedded in a resin to form a desired shape.

12 Claims, 3 Drawing Sheets

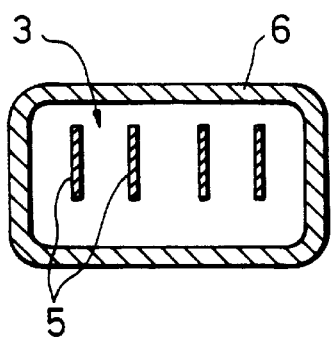
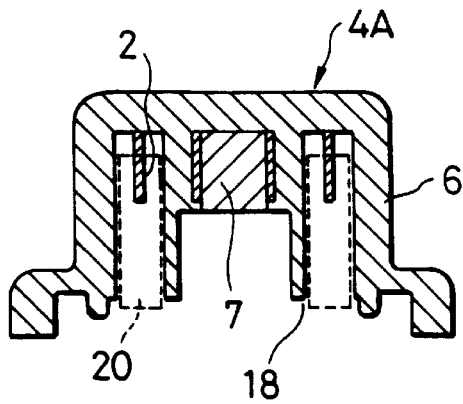
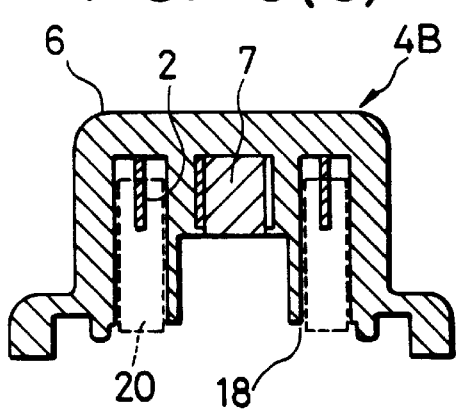
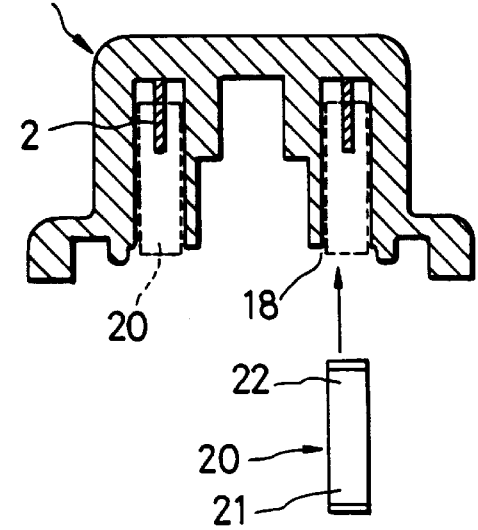
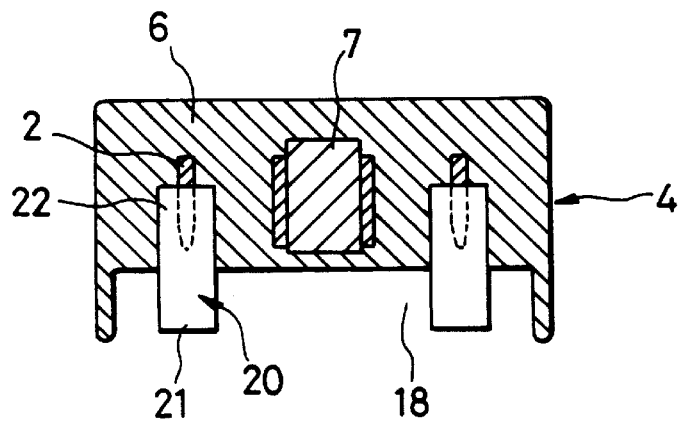

METHOD FOR RESIN INSERT MOLDING A CONNECTOR BLOCK FOR INJECTORS OF AN INTERNAL COMBUSTION ENGINE

This is a Division of application Ser. No. 08/338,854 filed Nov. 14, 1994, now U.S. Pat. No. 5,709,559.

The invention relates to a method of resin insert molding a metal member, such as an electrical component for an automobile. The invention also relates to a connector block for injectors of an internal combustion engine, in which a metal member such as an electric conductor is embedded in a resin. The connector block can be produced by the resin insert molding method.

Molded products made of multiple materials, which may include, for example, metal members inserted into a resin, are injection molded using a process in which the metal members are held in a desired attitude in a mold cavity of a mold for resin molding. Each metal member inserted into the mold cavity is fixed by holding pins. protruding into the mold cavity, which leaves holding pin holes that communicate with the metal member after the mold is removed. Even if the holes are filled after the resin molding process, the post-filled portions are not sufficiently waterproof and airtight. As a result, this technique may cause corrosion of the metal member. In addition, when the metal member is used as an electric conductor, electric failure may occur.

A molding method for eliminating these disadvantages has been proposed in Japanese Patent Publication (Kokai) No. HEI4-263913. In the proposed method, a bus bar bundle, which has bus bars arranged in a desired manner, is partially embedded and held, and a preformed portion having leftover holding pin holes is primarily formed by resin molding. The bus bar bundle with the preformed portion is then inserted into a mold cavity of a mold for resin molding, and the inserted attitude is fixed by fitting holding pins of the mold into the holding pin holes of the preformed portion. Secondary processing is conducted so that the bus bar bundle with the preformed portion is embedded in a resin to form a desired form.

On the other hand, Japanese Utility Model Publication (Kokai) No. HEI3-77062, and Japanese Patent Publication (Kokai) No. HEI4-263913 disclose connector blocks for injectors of an internal combustion engine in which connecting ends are formed by vertically bending bus bars to form tip ends that rise from the bus bar main portions and function as tab terminals. Each of the bus bars, except the tab terminals, is embedded in a resin so that the tab terminals are formed as an injector connecting portion protruding from the main portion.

Although the molding methods described above have the advantages that the bus bars embedded in the resin are prevented from being corroded and electrically short-circuited, one method requires complex bus bar shapes and a plurality of steps to resin-mold the insert, and the other method requires primary molding for providing the preformed portion and secondary molding for producing the desired final resin molding product. Therefore, the operation is cumbersome so that the molding productivity is poor and molding costs are high.

The prior art connector block for injectors of an internal combustion engine has several drawbacks. For example, the shape of the bus bars for forming the injector connecting portion is complex and hence requires a great deal of manufacturing time, which increases the cost. The configuration in which the injector connection portion protrudes from the main portion (having a bar-like shape) increases the size of the connector block. From a qualitative viewpoint of preventing the bus bar from being corroded and electrically short-circuiting, the prior art methods require resin-molding according to primary and secondary molding steps, thereby inevitably further increasing the cost.

SUMMARY OF THE INVENTION

One object of the invention is to provide a molding method, and a connector block for injectors of an internal combustion engine that can eliminate the above-discussed disadvantages.

In a first aspect of the present invention, there is provided a method for insert molding a connector having metal members embedded in a resin. The metal members are inserted into a mold cavity of a mold for resin molding. The mold has holding pins protruding therefrom. The method includes placing the metal members in a molding position by inserting the metal members within slots of a core, the metal members and the core forming a molding assembly; inserting the molding assembly into the mold cavity while fitting front half portions of the holding pins into holding pin holes of the core, the holding pin holes being positioned to create a separation layer between surfaces of the holding pin holes and the metal members, the core having positioning projections butting against an inner wall of the mold cavity; and injecting the resin into the mold cavity.

In a second aspect of the present invention, there is provided a method for molding a connector having a bar-like shape, the connector including a resin, at least one metal band and a core member. The method includes placing the metal band within a slot provided on the core member to form a molding assembly; inserting the molding assembly within a mold cavity of a mold; and injecting the resin into the mold cavity to form the bar-like shape.

According to another aspect of the present invention, there is provided a connector block for injectors of an internal combustion engine. The connector block includes a bar-like body having a core member embedded in a resin. The core member accommodates bus bars each having a band-like shape and the bus bars are arranged in parallel to each-other. Also provided is a wire harness connecting portion formed at one end of said bar-like body such that the bus bars have tip ends exposed in the connecting portion. Injector connecting portions are provided for connecting the bus bars through junction terminals to injectors of an internal combustion engine. The injector connecting portions are formed at a plurality of positions on the bar-like body. The connector block for injectors may have a structure in which the bus bars are exposed in coupling recesses that open downward to allow junction terminals to be attached to the exposed bus bars. The bus bars are electrically connected through the junction terminals to the injectors of the internal combustion engine.

In still another aspect of the present invention, there is provided a connector block that includes a core member having a plurality of slots, a plurality of band-like metal bus bars disposed in respective ones of the slots, and a resin disposed above the slots so that the bus bars are located between the resin and the core member.

In the molding method of the invention, the bus bars are set in the core member, and the core member is inserted into and held in the mold cavity of the mold and embedded in a resin. Therefore, resin injection molding can be accomplished by a single step so that the molding process is simplified and molding productivity is improved. In a resin insert molding product of the metal member that is formed by the method, the separation layer formed by the core member is created or formed between the holding pin holes and the metal member. Therefore, contact between the metal member and air or water is completely prevented from occurring, thereby sufficiently ensuring waterproof and airtight connectors.

The connector block for injectors of an internal combustion engine, which is configured as described above, is formed by the molding method, and hence can attain the above-mentioned functions. The connector block has a structure in which the bus bars have a simple bar-like shape and are arranged in parallel with their faces opposed to each other. Intermediate and end portions of the bus bars are formed as the injector connecting portions that connect through the junction terminals to the injectors of the internal combustion engine. Moreover, the bus bars have a simple structure, thereby promoting the simplification in structure and the miniaturization of the injector connector block. Because the bus bars are simple and thus free from a complex shape, the process of forming the bus bars can be streamlined and simplified.

These and other aspects and advantages of the present invention are described in or apparent from the following detailed description of preferred embodiments.

BRIEF DESCRIPTION OF THE DRAWINGS

The invention will be described in detail with reference to the following drawings, wherein:

FIGS. 5(A)–(D) show section shapes of main portions of the injector connector block of the embodiment of FIGS. 1(A)–(D), FIG. 5(A) is a section view of a wire harness connecting portion, and FIG. 5(B), FIG. 5(C), and FIG. 5(D) are section views of injector connecting portions; and FIG. 6 is a section view of an injector connecting portion of an injector connector block according to another embodiment of the invention.

DETAILED DESCRIPTION OF PREFERRED EMBODIMENTS

Figure 1:
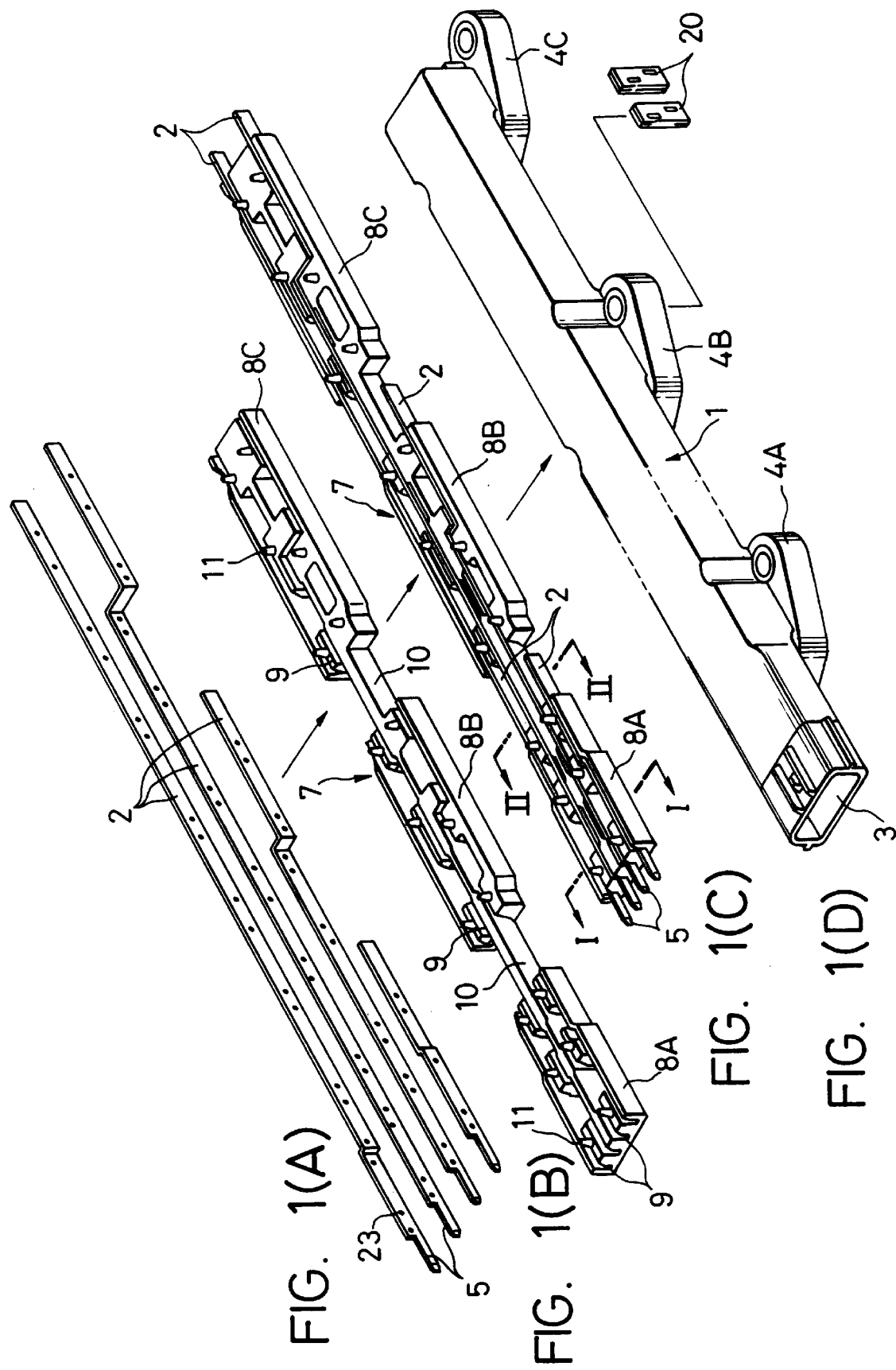
FIGS. 1(A)–(D) show the molding method and structure of a connector block for injectors of an internal combustion engine of an embodiment of the invention, illustrating the sequential molding procedure.

Hereinafter, a first embodiment of the invention will be described with reference to FIGS. 1(A)–(D) showing the molding procedure, method, and structure of the connector block. A connector block 1 for injectors of an internal combustion engine includes bus bars 2 having metal members formed by a resin insert molding process. Four bus bars 2 (FIG. 1(A)) have a simple band-like shape and straight, unbent band edges arranged in parallel in such a manner that faces of adjacent bands are opposed to each other. Ends on one side of the bus bars 2 protrude to form tab-like terminals 5, thereby constituting a wire harness connecting portion 3. Injector connecting portions 4A, 4B, and 4C (FIG. 1(D)), through which the bus bars 2 in the arranged attitude are partially exposed, are formed at the other ends and intermediate positions of the bus bars 2. Each bus bar 2, except the tab-like terminals 5 and the injector connecting portions 4A, 4B, and 4C, is embedded in a resin, thereby forming the bar-like connector block 1 for injectors of an internal combustion engine. In the formation of the connector block 1, a core member 7 (FIG. 1(B)) for accommodating the bus bars 2 in the predetermined attitude or first position is used. The core member 7 is inserted and held in a mold cavity 16 (FIG. 4) of a mold for resin molding, and a single step of resin injection molding is conducted to form a resin molding product of a desired shape.

Figure 3:
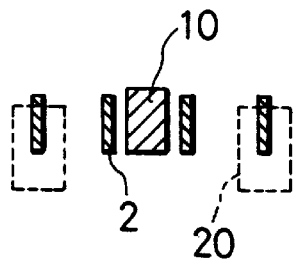
FIG. 3 is a section view taken along line II—II of FIG. 1(C)

Specifically, the core member 7 has a structure in which bus bar receiving portions 8A, 8B, and 8C are formed at intervals in the main column portion 10 passing through the longitudinal center of the core member 7. The bus bar receiving portions 8A, 8B, and 8C have bus bar slots 9 for respectively receiving the band-like bus bars 2 in such a manner that the bus bars extend in the longitudinal direction of the core member. The portion between the bus bar receiving portions 8A and 8B, and that between the bus bar receiving portions 8B and 8C, are configured only by the main column portion 10. When the four bus bars 2 are inserted from the top of the bus bar slots 9, the bus bars 2 are held in the desired attitude or position in the resin insert 7. The bus bars 2 in the region of main column portion 10 are exposed (FIG. 3). The tab-like terminals 5 at the ends of one side of the bus bars 2 protrude from a front end of the bus bar receiving portion 8A. Only two bus bars 2 protrude in a desired length toward the back of the bus bar receiving portion 8C in the rear end, thereby constituting a bar-like body made of the resin.

Figure 2:
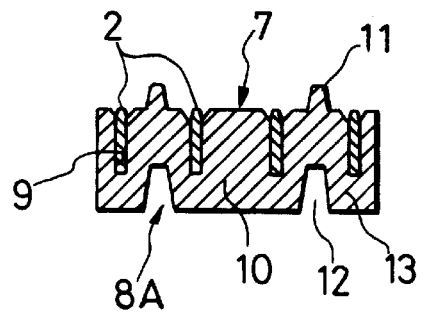
FIG. 2 is a section view taken along line I—I of FIG. 1(C)
Figure 4:
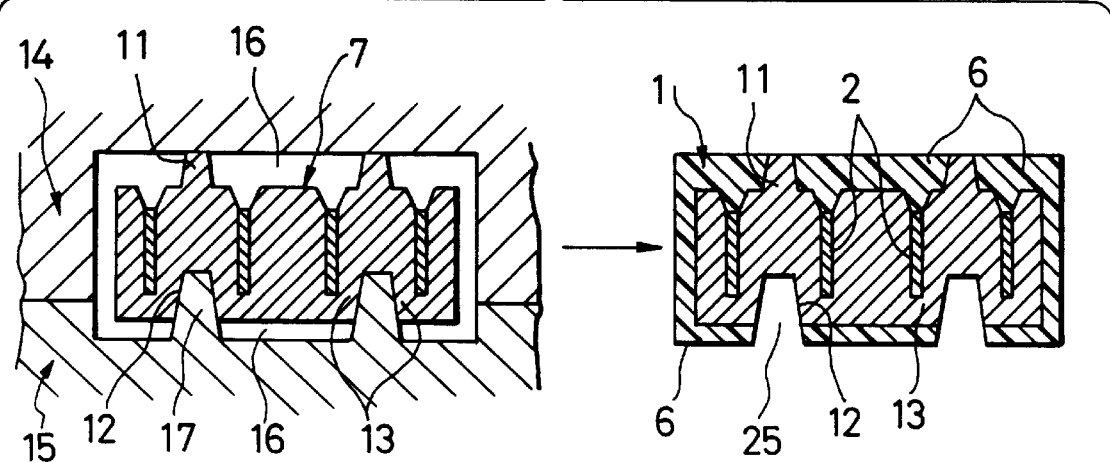
FIG. 4 is a cross section view showing a state in which a core member used in the embodiment of FIGS. 1(A)–(D) is inserted into a mold cavity.

Moreover, with reference to FIGS. 2 and 4, the bus bar receiving portions 8A, 8B, and 8C of the core member 7 are provided with positioning projections 11 when the core member 7 is inserted into a mold cavity 16 in a resin molding step (described later). Front half portions of holding pins 17 of the mold protrude into the mold cavity 16 and holding pin holes 12, and are fitted and oriented in such a manner that the bottoms of the holes do not reach the bus bars 2, thereby creating a separation layer 13 so that the bus bars 2 are not exposed.

The bus bars 2 are provided with engaging projections 23 for holding the attitude of the inserted bus bars 2, and the bus bar slots 9 are provided with dimples (not shown) for receiving the engaging projections 23. In the case where the dimples are not formed, the bus bars 2 may have dimensions under which the bus bars 2 are forcedly inserted into the bus bar slots 9, thereby holding the attitude of the bus bars 2.

The bus bars 2 are accommodated and set in the core member 7. The core member 7 in the accommodated state is inserted into the mold cavity 16 formed by combining upper and lower molds 14 and 15 (see FIG. 4). The positioning projections 11 of the core member 7 butt against the inner wall of the mold cavity 16, and the holding pins 17 protruding from the lower mold 15 are fitted into the holding-pin holes 12 of the core member 7 so that the inserted attitude of the core member is fixed. A resin is injected into the space in the periphery of the core member 7 in the inserted attitude, so that the bus bars 2 are embedded in the resin 6 to form the bar-like injector connector block 1 having a desired shape. Holes 25 formed by the holding pins 17 are post-filled as required.

With reference to FIG. 5(A), the injector connector block 1 formed by the injection process described above has a structure in which the wire harness connecting portion 3 is formed by enclosing the tab-like terminals 5 by the resin 6. The portions of the core member 7 in the regions adjacent the main column portion 10 are configured as the injector connecting portions 4A, 4B, and 4C (see FIGS. 5(B), 5(C), and 5(D)), wherein intermediate and end portions of the bus bars 2 are exposed in coupling recesses 18 that open downwardly. Junction terminals 20 each have a first end including a bus bar contacting portion 22, and a second end including an injector contacting portion 21. The portions 21 and 22 are respectively formed and attached to respective ones of the exposed bus bars 2 of the injector connecting portions 4A, 4B, and 4C. The injector connector block 1 is pressed down against the top of a group of injectors (not shown) of an internal combustion engine to be attached thereto. The injector connecting portions 4A, 4B, and 4C are coupled with the respective injectors, and connectors of a wire harness are coupled with the wire harness connecting portion 3, thereby electrically connecting the injectors to the wire harness.

The molding method of the invention and the injector connector block 1 formed by the molding method perform the above-mentioned function, and the formation can be accomplished by a single resin molding step. Therefore, the molding process can be simplified so that the cost is reduced. Moreover, the injector connector block 1 is free from a bulge portion or a protruding portion, and hence bus bars to be inserted can have a simplified shape, thereby reducing overall size and cost.

The injector connector block 1 of the invention is not restricted to the embodiment described above. For example, the injector connecting portions 4 may have a structure in which, as shown in FIG. 6, the junction terminals 20 are previously combined with the bus bars 2. Only injector connecting portions 21, which are lower portions of the junction terminals 20, are exposed in the coupling recesses 18. The bus bars 2, and the upper portions of the junction terminals 20, are embedded in the resin 6. The method of resin insert molding a metal member of the invention can be used not only in the formation of the above-mentioned injector connector block 1 but also in a wide variety of formations wherein plural metal members are arranged in a specified layout and then insert-molded in a resin.

As described above, according to the method of resin insert molding a metal member of the invention, plural metal members can be insert-molded in a resin while specifying their arranged attitude by a single step of injection molding using a mold for resin molding. Therefore, the molding process can be simplified so that the moldability is improved and the molding cost is reduced. The connector block for injectors of an internal combustion engine of the invention, which is produced by the molding method, can attain the above-mentioned effects of improved moldability and reduced molding cost. Other advantages and effects are that the bus bars can have a simple shape and hence the overall structure can be simplified and reduced in size, thereby further promoting miniaturization of the connector block and reduction of cost.

The invention has been described in detail with reference to preferred embodiments thereof, which are intended to be illustrative and not limiting. Various modifications can be made without departing from the spirit and scope of the invention as defined in the appended claims.

What is claimed is:

1. A method for insert molding a connector having at least one metal member, said method comprising the steps of:
   providing a core having a plurality of slots;
   placing the at least one metal member in a molding position by inserting the at least one metal member within a corresponding slot of the core, the at least one metal member and the core forming a molding assembly;
   inserting the molding assembly into a mold cavity formed of a separable mold by fitting portions of holding pins extending from a mold surface into the mold cavity into holding pin holes formed in the core, the holding pin holes being positioned to create a separation layer between surfaces of the holding pin holes and the metal members, the core having positioning projections butting against an inner wall of the mold cavity;
   injecting the resin into the mold cavity around the molding assembly to form the connector; and
   separating the mold to free the connector.

2. A method for molding a connector having a bar shape, said connector including a resin, at least one metal band and a core member, the method comprising:
   providing the core member with a plurality of slots;
   placing the at least one metal band within a corresponding slot provided in one surface of the core member to form a molding assembly;
   inserting the molding assembly within a mold cavity of a mold;
   injecting the resin into the mold cavity to enclose the molding assembly and form the connector; and
   removing the connector from the mold.

3. The method of claim 2, wherein the inserting includes inserting at least one holding pin formed on the mold and extending into the mold cavity into a corresponding holding pin recess formed on the core member, and abutting at least one positioning protrusion formed on the core member against an inner surface of said mold, said positioning protrusion forming a space between the metal band and said inner surface of said mold, said resin being injected into and filling said space, wherein the holding pin recess is oriented to create a separation layer between the metal band and surfaces of the holding pin recess.

4. The method of claim 2, wherein the placing includes placing a junction terminal as well as said metal band in said core member to form said molding assembly.

5. The method of claim 4, further comprising connecting the metal band, through said junction terminal, with an injector of an internal combustion engine.

6. A method for molding a connector, comprising:
   mounting at least one bus bar in a preformed core, the preformed core having a retention channel for each bus bar of the at least one bus bar to form a molding assembly, a surface of the core, opposite a surface having the at least one retention channel, having at least one holding pin hole;
   mounting the molding assembly to a first mold by mating the at least one holding pin hole with a corresponding holding pin extending from the first mold, the mounting providing a separation between the molding assembly and the first mold;
   joining a second mold to the first mold to define a cavity retaining the molding assembly therein, the second mold having a spacing from the molding assembly;
   injecting resin into the cavity; and
   removing the first mold and second mold to free the connector so formed, wherein the at least one retention channel and the at least one holding pin hole are separated from one another with a portion of the core therebetween.

7. The method according to claim 6, wherein a protrusion extending from the core contacts a surface of the second mold to define the spacing.

8. The method according to claim 6, further comprising attaching a junction terminal to the at least one bus bar.

9. The method according to claim 8, wherein the step of attaching a junction terminal is executed prior to the step of mounting the molding assembly to a lower mold.

10. The method according to claim 8, wherein the step of attaching a junction terminal is executed after the step of removing the first mold and the second mold.

11. A method for molding a connector block having an elongate body for injectors of an internal combustion engine, comprising the steps of:

provviding a core member that extends along at least a majority of the length of the elongate body, said core member having a plurality of slots;

seating a plurality of band-shaped bus bars in the plurality of slots, said plurality of bus bars being arranged parallel to one another;

embedding said core member in a resin;

forming a wire harness connecting portion at one end of the elongate body, said plurality of bus bars having tip ends exposed in said connecting portion; and forming injector connecting portions at a plurality of positions on the elongate body for connecting said bus bars through junction terminals located at said injector connecting portions to injectors of an internal combustion engine.

12. A method for molding a connector block having an elongate body for injectors of an internal combustion engine, comprising the steps of:

providing a core member having a plurality of slots;

accommodating band-shaped bus bars in said plurality of slots, said bus bars being arranged parallel to one another;

embedding said core member in a resin, the resin disposed above said slots and molded over the bus bars so that at least a majority of continuous length of the bus bars is located between the resin and the core member;

forming a wire harness connecting portion at one end of said elongate body, said bus bars having tip ends exposed in said connecting portion; and forming injector connecting portions at a plurality of positions on said elongate body for connecting said bus bars through junction terminals located at said injector connecting portions to injectors of an internal combustion engine.

* * * * *